United States Patent
Tong

(10) Patent No.: US 6,770,219 B2
(45) Date of Patent: Aug. 3, 2004

(54) COMPOSITION AND METHOD FOR PREVENTING FOULING IN (METH) ACRYLIC ACID PROCESSES

(75) Inventor: David Youdong Tong, Houston, TX (US)

(73) Assignee: Nalco Energy Services, Sugar Land, TX (US)

( * ) Notice: Subject to any disclaimer, the term of this patent is extended or adjusted under 35 U.S.C. 154(b) by 93 days.

(21) Appl. No.: 10/271,962

(22) Filed: Oct. 15, 2002

(65) Prior Publication Data

US 2004/0072974 A1 Apr. 15, 2004

(51) Int. Cl.$^7$ ............................................. C07C 51/50
(52) U.S. Cl. .................. 252/182.29; 252/405; 252/406; 252/407; 526/263; 526/303.1; 526/319; 526/320; 526/328.5; 526/329.7; 558/305; 558/306; 560/218; 562/600; 568/484
(58) Field of Search .............................. 252/182.29, 405, 252/406, 407; 526/263, 303.1, 319, 320, 328.5, 329.7; 558/305, 306; 560/218; 562/600; 568/484

(56) References Cited

U.S. PATENT DOCUMENTS

| | | | | |
|---|---|---|---|---|
| 5,710,329 A | * | 1/1998 | Clever | 562/600 |
| 6,271,283 B1 | * | 8/2001 | Shimada et al. | 523/122 |
| 2001/0006226 A1 | * | 7/2001 | Ishida et al. | 252/182.18 |
| 2001/0050216 A1 | * | 12/2001 | Kroker et al. | 203/6 |
| 2003/0225230 A1 | * | 12/2003 | Undrum et al. | 526/257 |

* cited by examiner

*Primary Examiner*—Fred Teskin
(74) *Attorney, Agent, or Firm*—Michael B. Martin; Thomas M. Breininger

(57) ABSTRACT

An antifoulant composition comprising (meth)acrylic acid and one or more (meth)acrylate or (meth)acrylamide antifoulant polymers and a method of preventing fouling in (meth)acrylic acid processes comprising adding the (meth) acrylate or (meth)acrylamide antifoulant polymers to the (meth)acrylic acid process stream.

26 Claims, No Drawings

US 6,770,219 B2

COMPOSITION AND METHOD FOR PREVENTING FOULING IN (METH) ACRYLIC ACID PROCESSES

TECHNICAL FIELD

This invention relates to a composition and method of preventing fouling in (meth)acrylic acid processes. More particularly, this invention is a composition comprising (meth)acrylate or (meth)acrylamide antifoulant polymers, and use of the composition to prevent fouling in (meth) acrylic acid manufacturing processes and processes in which (meth)acrylic acid is used in a reaction and where unreacted (meth)acrylic acid is recovered.

BACKGROUND OF THE INVENTION (Meth)acrylic acids are monomers used to prepare many polymeric materials. However, their tendency to polymerize makes their manufacture, transportation and storage difficult. This is especially true in processes involving manufacturing and reclaiming the monomers, in which elevated operating temperature increases undesired polymerization. Under such circumstances, polymer formation becomes so severe that the polymer precipitates and fouls process equipment. Eventually, equipment shutdown and cleaning is required for removal of the polymeric foulant.

Conventionally, polymerization inhibitors are used in (meth)acrylic acid processes to prevent undesired polymerization. Typical polymerization inhibitors are phenolic compounds, amines, quinones, nitroxyl compounds and certain inorganic complexes. Phenothiazine (PTZ), hydroquinone (HQ) and monomethyl hydroquinone ether (MEHQ) are examples of the most widely used inhibitors. These inhibitors are designed to interrupt the polymerization reactions and prevent formation of the polymer. However, none of the available inhibitors are efficient enough to completely eliminate undesired polymer formation. Even in the presence of these inhibitors, polymer formation and subsequent fouling is still substantial, so that periodic cleaning is part of routine operation.

There is, therefore, an ongoing need to develop improved treatments, in addition to polymerization inhibitors, to control fouling in (meth)acrylic acid processes.

SUMMARY OF THE INVENTION

This invention is an antifoulant composition comprising (meth)acrylic acid and one or more (meth)acrylate or (meth) acrylamide antifoulant polymers, the antifoulant polymer prepared by polymerising
a) about 5 to 100 mole percent of one or more (meth)acrylate or (meth)acrylamide monomers of formula

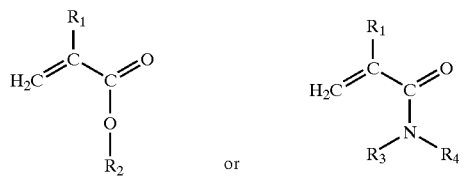

or a mixture thereof, wherein $R_1$ is independently selected at each occurrence from hydrogen and methyl; $R_2$ is selected from alkyl, aryl, cycloalkyl, alkylaryl, arylalkyl, aminoalkyl, aminoaryl, hydroxyalkyl, alkoxyalkyl, oxoalkyl and haloalkyl; and $R_3$ and $R_4$ are independently selected from hydrogen, alkyl, aryl, alkylaryl, arylalkyl, aminoalkyl, aminoaryl, hydroxyalkyl, alkoxyalkyl, oxoalkyl and haloalkyl, or $R_3$ and $R_4$, together with the nitrogen atom to which they are attached, form a heterocyclyl group; and
b) 0 to about 95 mole percent of one or more vinylic monomers.

DETAILED DESCRIPTION OF THE INVENTION

Definitions of Terms

"Alkoxy" means an alkyl-O— group where alkyl is defined herein. Representative alkoxy groups include methoxy, ethoxy, propoxy, butoxy, and the like.

"Alkoxyalkyl" means an alkoxy-alkylene- group where alkoxy and alkylene are defined herein. Representative alkoxyalkyl groups include methoxymethyl, methoxyethyl, ethoxyethyl, (2-methylpropoxy)methyl, butoxymethyl, and the like.

"Alkyl" means a monovalent group derived from a straight or branched chain saturated hydrocarbon having from 1 to about 30 carbon atoms by the removal of a single hydrogen atom. Preferred alkyl have from 4 to about 22 carbon atoms. The alkyl group may be interrupted with one or more oxygen or sulfur atoms, or one or more groups of formula —$NY^1$— where $Y^1$ is defined herein, provided that no two oxygen or sulfur atoms or —$NY^1$— groups are attached to one another. Representative alkyl groups include ethyl, n- and iso-propyl, n-, sec-, iso- and tert-butyl, lauryl, octadecyl, and the like.

"Alkylaryl" means an alkyl-arylene- group where alkyl and arylene are defined herein. Representative alkylaryl include tolyl, ethylphenyl, propylphenyl, nonylphenyl, and the like.

"Alkylene" means a divalent group derived from a straight or branched chain saturated hydrocarbon having from 1 to about 30 carbon atoms by the removal of two hydrogen atoms. Preferred alkylene have about 3 to about 15 carbon atoms. Representative alkylene groups include methylene, ethylene, propylene, isobutylene, and the like.

"Amino" means a group of formula $Y^1Y^2N$— and quaternary salts thereof where $Y^1$ and $Y^2$ are independently hydrogen, alkyl, aryl, heterocyclyl or arylalkyl as defined herein. Representative amino groups include amino (—$NH_2$), methylamino, ethylamino, iso-propylamino, tert-butylamino, dimethylamino, diethylamino, methylethylamino, piperidino, and the like.

"Aminoalkyl" means an amino-alkylene- group wherein amino and alkylene are defined herein. Representative aminoalkyl groups include 3-dimethylaminopropyl, dimethylaminoethyl, and the like.

"Aminoaryl" means an amino-arylene- group where amino and arylene are defined herein.

"Aryl" means substituted and unsubstituted aromatic carbocyclic radicals and substituted and unsubstituted heterocyclic radicals having about 5 to about 14 ring atoms. Representative aryl include phenyl naphthyl, phenanthryl, anthracyl, pyridyl, furyl, pyrrolyl, quinolyl, thienyl, thiazolyl, pyrimidyl, indolyl, and the like. The aryl is optionally substituted with one or more groups selected from hydroxy, halogen, $C_1$–$C_4$ alkyl and $C_1$–$C_4$ alkoxy.

"Arylalkyl" means an aryl-alkylene- group wherein aryl and alkylene are defined herein. Representative arylalkyl include benzyl, phenylethyl, phenylpropyl, 1-naphthylmethyl, and the like.

"Arylene" means an aromatic monocyclic or multicyclic ring system derived from an aryl as defined herein by the removal of two hydrogen atoms.

"Cycloalkyl" means a monovalent group derived from a monocyclic or bicyclic saturated carbocyclic ring compound by the removal of a single hydrogen atom. Examples include cyclopropyl, cyclobutyl, cyclopentyl, cyclohexyl, bicyclo[2.2.1]heptanyl, bicyclo[2.2.2]octanyl, and the like.

"Heterocyclyl" means an aromatic or non-aromatic monocyclic or multicyclic ring system of about 3 to about 10 ring atoms, preferably about 5 to about 10 ring atoms, in which one or more of the atoms in the ring system is/are element(s) other than carbon, for example nitrogen, oxygen or sulfur. Preferred ring sizes of rings of the ring system include about 5 to about 6 ring atoms. The heterocyclyl is optionally substituted by one or more hydroxy, alkoxy, amino or thio groups. Representative saturated heterocyclyl rings include piperidyl, pyrrolidinyl, piperazinyl, morpholinyl, thiomorpholinyl, and the like. Representative aromatic heterocyclyl rings include pyrazinyl, pyridyl, pyrimidinyl, isoxazolyl, isothiazolyl, pyrazolyl, pyrrolyl, pyrazolyl, triazolyl, and the like.

"Haloalkyl" means an alkyl group as defined herein substituted by one or more halogen atoms. Representative haloalkyl groups include chloromethyl, bromoethyl, trifluoromethyl, and the like.

"Hydroxyalkyl" means an alkyl group as defined herein substituted by one or more to hydroxyl groups, provided that no more than one hydroxy group may be attached to a single carbon atom of the alkyl group. Representative hydroxyalkyl include hydroxyethyl, 2-hydroxypropyl, and the like.

"(Meth)acrylamide" means acrylamide and methacrylamide.

"(Meth)acrylic acid means methacrylic acid and acrylic acid.

"(Meth)acrylic acid process" means processes for manufacturing acrylic acid and methacrylic acid, particularly the recovery and purification processes of the manufacturing process. (Meth)acrylic acid process also include processes in which (meth)acrylic acid is used in a reaction and where unreacted (meth)acrylic acid is recovered, such as esterification of (meth)acrylic acid. Also included are other manufacturing processes in which (meth)acrylic acid occurs as a significant by-product and is present in the initial stages of purification of the manufactured product, for example, acrolein and acrylonitrile manufacture.

"Oxoalkyl" means an alkyl group as defined herein where the alkyl chain is interrupted by one or more oxo ($>C=O$) groups.

"Preventing" means both preventing and inhibiting.

"Vinylic monomer" means a monomer containing one or more polymerizable carbon-carbon double bonds.

Preferred Embodiments

This invention is a composition comprising (meth)acrylic acid and one or more antifoulant polymers containing (meth)acrylate or (meth)acrylamide repeating units and use of the composition to mitigate the fouling in the recovery and purification section of the (meth)acrylic acid manufacture process and related processes.

As used herein, "(meth)acrylate and/or (meth)acrylamide-containing polymer" means homopolymers or copolymers prepared by polymerization of (meth)acrylate and/or (meth)acrylamide monomers and optionally one or more suitable vinylic monomers.

The polymerization is by any number of free radical polymerization techniques known in the art including, for example, bulk, solution, gel, suspension or emulsion polymerization.

In an emulsion polymerization, the desired monomers are dissolved in an aqueous phase, one or more emulsifying agent(s) are dissolved in an oil phase and emulsifying the water phase in the oil phase to prepare a water-in-oil emulsion, and polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinylic and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing latex polymers include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

A gel polymerization is defined as a process for producing polymers as dry powders. The preparation of high molecular weight water-soluble polymers as dry powders using a gel polymerization is generally performed as follows. An aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube and cooled in an ice bath. Polymerization initiator(s) are added to the cooled solution, the solution is purged with nitrogen, and the temperature of the reaction is allowed to rise uncontrolled. When the polymerized mass is cooled, the resultant gel is removed from the reactor, shredded, dried in an oven to a moisture content of about 10 percent, and ground to the desired particle size.

In a solution polymerization, the monomers, initiators and any additional additives are combined in a solvent in which the polymer is soluble. The solvent and concentration are selected such that the resulting polymer solution is reasonably concentrated and not too viscous. Representative solvents include water and aliphatic and aromatic hydrocarbons such as xylene, toluene, paraffin oil, mineral spirits, kerosene, naphtha, and the like. A suspension polymerization is similar to a solution polymerization except that the polymer is insoluble in the reaction medium and therefore precipitates as fine particles.

In a preferred aspect of this invention, the (meth)acrylate or (meth)acrylamide monomers are selected from methyl acrylate, ethyl acrylate, butyl acrylate, 2-ethylhexyl acrylate, methyl methacrylate, diethylaminoethyl methacrylate, ethyl methacrylate, isobutyl methacrylate, cyclohexyl methacrylate, lauryl methacrylate, dodecyl methacrylate, octadecyl methacrylate, benzyl methacrylate, ethoxy methacrylate, hydroxypropyl methacrylate, diethylaminoethyl methacrylate, 3-dimethylaminopropyl methacrylamide, N-butyl acrylamide, fluoroalkylethyl methacrylate, N-tert-butyl acrylamide, 2-hydroxypropyl methacrylamide, N-(butoxymethyl) methacrylamide, N-(2-methylpropoxy) methyl methacrylamide, methacrylic acid sodium salt and dimethylaminoethyl methacrylate sulfuric acid salt.

In another preferred embodiment, the vinylic monomer is selected from ethylene, propylene, butadiene, isoprene, styrene, vinyl acetate, vinyl chloride, vinyl pyrrolidone, vinyl caprolactam, tetrafluoroethylene, vinylidene chloride, vinyl sulfonic acid, acrylonitrile, methacrylonitrile, vinyl methyl ether, vinyl cyclohexane, acrolein, vinyl butyl sulfide, vinyl ethyl ketone, vinyl pyridine, allyl acetate, allyl alcohol, allyl amine, maleic acid, maleic acid esters, maleic anhydride, fumaric acid and fumaric acid esters.

In another preferred aspect, the antifoulant polymer is selected from poly 2-ethylhexyl acrylate, 2-ethylhexyl acrylate-co-styrene, poly 2-ethylhexyl acrylate-co-diethylaminoethyl methacrylate, poly 2-ethylhexyl acrylate-co-vinyl acetate, poly ethyl methacrylate, poly isobutyl methacrylate, poly cyclohexyl methacrylate, poly ethylhexyl methacrylate, poly lauryl methacrylate, poly dodecyl methacrylate, poly octadecyl methacrylate, poly benzyl methacrylate, polyethoxy methacrylate, poly hydroxypropyl methacrylate, poly dimethylaminoethyl methacrylate, poly diethylaminoethyl methacrylate, poly 3-dimethylaminopropyl methacrylamide, poly vinylpyrrolidone-co-dimetylaminoethyl methacrylate, poly lauryl methacrylate-co-ethylene glycol dimethacrylate, poly lauryl methacrylate-co-acrylonitrile, poly lauryl methacrylate-co-(N-butyl acrylamide), poly lauryl methacrylate-co-vinylpyridine, poly lauryl methacrylate-co-diethylaminoethyl metacrylate, poly fluoroalkylethyl methacrylate-co-styrene, poly dimethylaminoethyl methacrylate-co-vinylpyrrolidone-co-vinylcaprolactam, poly N-tert-butyl acrylamide-co-styrene, poly N-(2-hydroxypropyl) methacrylamide, poly N-(butoxymethyl) methacrylamide, poly N-[(2-methylpropxoy)methyl] methacrylamide, poly methacrylic acid sodium salt, poly dimethylaminoethyl methacrylate sulfuric acid salt, and poly butyl methacrylate-co-dimethylaminoethyl metacrylate-co-dodecyl methacrylate-co-octadecyl methacrylate.

In another preferred aspect, the antifoulant polymer is selected from poly 2-ethylhexyl acrylate, 2-ethylhexyl acrylate-co-styrene, poly 2-ethylhexyl acrylate-co-diethylaminoethyl methacrylate, poly 2-ethylhexyl acrylate-co-vinyl acetate, polyethoxy methacrylate, poly vinylpyrrolidone-co-dimetylaminoethyl methacrylate, poly lauryl methacrylate-co-ethylene glycol dimethacrylate, poly lauryl methacrylate-co-acrylonitrile, poly lauryl methacrylate-co-(N-butyl acrylamide), poly lauryl methacrylate-co-diethylaminoethyl metacrylate, poly fluoroalkylethyl methacrylate-co-styrene, poly dimethylaminoethyl methacrylate-co-vinylpyrrolidone-co-vinylcaprolactam, poly N-tert-butyl acrylamide-co-styrene, poly butyl methacrylate-co-dimethylaminoethyl metacrylate-co-dodecyl methacrylate-co-octadecyl methacrylate.

The (meth)acrylate and/or (meth)acrylamide-containing antifoulant polymers of this invention typically have a weight average molecular weight of about 1,000 to about 2,000,000, preferably about 5,000 to about 500,000 and more preferably about 10,000 to about 300,000.

The antifoulant polymers can be used neat or blended with a suitable solvent. Most of the poly (meth)acrylate and/or (meth)acrylamide-containing polymers are solid materials at room temperature. For the convenience of application (handling, injection and distribution), a suitable solvent is often required to formulate the polymers into a liquid form. A suitable solvent not only should dissolve the polymer, but also has to be compatible with the (meth) acrylic acid process. Potential solvents are aliphatic distillates, acrylic acid, methacrylic acid, alkyl-acrylate, methacrylate, commercial extraction solvents, aromatics, alcohols, ethers and ketones.

Accordingly, in another preferred aspect, the antifoulant composition further comprises one or more solvents.

The antifoulant composition can also include one or more additional dispersant antifoulants. This is especially important when a fouling situation originates from several fouling sources other than polymerized (meth)acrylic acid. Other dispersant antifoulants may be more effective than the (meth)acrylate and/or (meth)acrylamide-containing polymers for certain fouling from other causes. In this case a combination of the (meth)acrylate and/or (meth)acrylamide-containing polymers with other dispersant antifoulants will ensure efficient fouling control.

Accordingly, in another preferred aspect, the antifoulant composition further comprises one or more dispersants.

In another preferred aspect, the dispersants are selected from alkyl substituted aryl sulfonic acids such as dodecylbenzenesulfonic acid, and their salts, poly isobutylene succinic acid esters, poly isobutylene succinic acid imides of polyamines, alkylphenolethoxylates, alkylphenol-formaldehyde resins, fatty acid esters, fatty acid amides, fatty acid imidazolines, fatty alcohol ethoxylates and polysaccharide ethers and acetates.

The antifoulant composition may also include polymerization inhibitors. Polymerization inhibitors are conventionally used to suppress undesired polymerization in (meth) acrylic acid production.

In many cases multiple inhibitors are used in combination in (meth)acrylic acid processes. The term process polymerization inhibitor means any use, singly or in combination, of known polymerization inhibitors. Improvement in controlling fouling is observed using the antifoulant polymers of this invention in addition to process polymerization inhibitors to (meth)acrylic acid processes.

Accordingly, in another preferred aspect, the antifoulant composition further comprises one or more polymerization inhibitors.

In another preferred aspect, the polymerization inhibitors are selected from hydroquinone, hydroquinone monomethyl ether, phenothiazine, 4-hydroxyl-2,2,6,6-tetramethylpiperidino-1-oxyl, other nitroxyl compounds, N-alkylphenylenediamines, nitrosated N-alkylphenylenediamines, hydroxylamines, nitrosophenylhydroxylamines, nitrosodiphenylamine, copper complexes, manganese complexes, and mixtures thereof.

In another aspect, this invention is a method of preventing fouling in a (meth)acrylic acid process comprising adding to the process stream an effective antifouling amount one or more (meth)acrylate or (meth)acrylamide antifoulant polymers, the antifoulant polymers prepared by polymerising a) about 5 to 100 mole percent of one or more (meth)acrylate or (meth)acrylamide monomers of formula

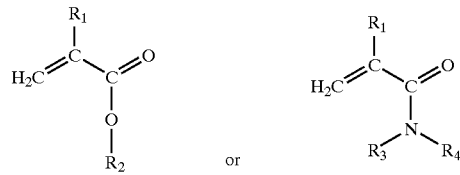

or a mixture thereof, wherein $R_1$ is independently selected at each occurrence from hydrogen and methyl; $R_2$ is selected from alkyl, aryl, cycloalkyl, alkylaryl, arylalkyl, aminoalkyl, aminoaryl, hydroxyalkyl, alkoxyalkyl, oxoalkyl and haloalkyl; and $R_3$ and $R_4$ are independently selected from hydrogen, alkyl, aryl, alkylaryl, arylalkyl, aminoalkyl, aminoaryl, hydroxyalkyl, alkoxyalkyl, oxoalkyl and haloalkyl, or $R_3$ and $R_4$, together with the nitrogen atom to which they are attached, form a heterocyclyl group; and b) 0 to about 95 mole percent of one or more vinylic monomers.

The dosage of the (meth)acrylate and/or (meth) acrylamide-containing anitfoulant polymers in the (meth) acrylic acid process is typically about 1 to about 10,000 part per million (ppm), preferably about 10 to about 1000 ppm and more preferably about 20 to about 200 ppm.

The injection of the (meth)acrylate and/or (meth) acrylamide-containing antifoulant polymer can be done continuously or intermittently.

In a preferred aspect of this invention, one or more polymerization inhibitors as defined herein are added to the process stream.

In another preferred aspect, one or more dispersants as defined herein are added to the process stream.

The (meth)acrylate and/or (meth)acrylamide-containing antifoulant polymer and polymerization inhibitors and/or dispersants may be added, for example, at different locations in the process stream, separately but at the same location, or together as part of a single combined formulation.

In a preferred aspect, the methacrylic acid process is selected from (meth)acrylic acid manufacturing processes.

Acrylic acid and methacrylic acid are most commonly prepared by catalytic gas phase oxidation of alkanes, alkenes, alkanols or alkenals containing 3 to 4 carbon atoms. The reaction products from the oxidation process are separated, and (meth)acrylic acid is purified in the recovery and purification section.

The design of the recovery and purification section varies with regard to process equipment and operating conditions, but fundamentally comprises extraction and distillation separation. In a generalized (meth)acrylic acid recovery and purification process, the effluent from the oxidation process is first cooled in an absorber to remove the light components in the product effluent. Then, in the extraction column, (meth)acrylic acid is extracted from the absorber effluent with a special solvent chosen for high selectivity for (meth) acrylic acid and low solubility for water and by products. The extract is subsequently vacuum-distilled in a solvent recovery column. The (meth)acrylic acid-free solvent is recycled as extraction solvent. The crude (meth)acrylic acid stream is then purified of remaining extraction solvent and reaction by-products in succeeding distillation towers. Design variations exist with altered tower sequence order, and, or the presence of single towers operating as a combination of towers.

Accordingly, in another preferred aspect, the (meth) acrylic acid manufacturing processes is selected from (meth) acrylic acid recovery and purification.

In another preferred aspect, the (meth)acrylic acid process is selected from processes in which (meth)acrylic acid is used in a reaction, processes where (meth)acrylic acid exists as a significant byproduct and processes where unreacted (meth)acrylic acid is recovered including (meth)acrylic acid esterification processes, acrolein manufacturing processes and acrylonitrile manufacturing processes.

The foregoing may be better understood by reference to the following Examples, which are presented for purposes of illustration and are not intended to limit the scope of this invention.

EXAMPLE 1

Preparation of 45 Mole Percent 2-ethylhexyl Acrylate/55 Mole Percent Styrene Copolymer A mixture of 2-ethyhexyl acrylate (59 g), styrene (40 g) and kerosene (58 g) is stirred under nitrogen purge at about 500 rpm. The temperature of the mixture is increased to about 40° C. and maintained at 40° C. for about one hour. 1-Dodecanethiol (0.09 g) and azobiisobutyronitrile (0.37 g) are then added in the mixture. The temperature is raised to about 80° C. and the reaction mixture is maintained at that temperature for three hours. Finally, the temperature is increased to around 104° C. and maintained for one hour. The polymer product has a weight average molecular weight of 60,800, measured by GPC. Additional polymers of (meth) acrylate and/or (meth)acrylamide with other vinylic monomers in any monomer unit mole ratio are prepared in a similar manner.

A bench scale total reflux distillation unit is used to simulate the polymer forming environment in the recovery and purification section of (meth)acrylic acid manufacturing unit and to evaluate antifoulant additives. The unit has a reflux condenser on the top, a tray section in the middle, and a 1 L boiler flask at the bottom. For an experiment with acrylic acid feed, the boiler flask is filled with about 450 g of acrylic acid, which is inhibited with about 200 ppm MEHQ. To ensure a safe operation, an additional amount of inhibitor, either 0.55 g MEHQ or 0.23 g PTZ, is added to the boiler flask. With constant heating applied from an electric heating mantle, the boiler flask boils acrylic acid and generates inhibitor-free acrylic acid vapor. The vapor travels up through the tray section and into the reflux condenser. The tray section contains six circular shelf metal trays, and the acrylic acid condensate from the reflux condenser drips back through the trays to the boiler flask. The unit is operated under a pressure of 160 to 190 mm Hg.

For a typical experiment, the unit is operated in a total reflux mode for 30 minutes. During the experiment, a liquid stream, either an additive solution or a control solvent, is continuously injected into the unit at a location above the tray section. The injected solution mixes well with the reflux condensate before the condensate drains down into the tray section ensuring that the tray section is in good contact with the injected liquid.

For an untreated experiment, additive-free solvent is continuously injected. Polymer forms and accumulates on the tray section with time. Polymer also precipitates out on the boiler flask inner wall above the liquid and at the bottom of the flask.

During a treated experiment, an additive solution is continuously injected. An effective additive results in less polymer accumulation on the tray section and on the flask wall. Polymer particles are also well dispersed in the boiler flask liquid.

The tray section is weighed before and after an experiment to quantify the polymer accumulation. Percentage reduction of polymer with an additive treatment is determined by comparing the polymer formation from the treated experiment with an untreated one. Visual observation is made to describe the polymer accumulation on the flask wall and the dispersion of polymer particles in the liquid.

Two feeds are used in antifoulant evaluation, acrylic acid and methacrylic acid.

EXAMPLE 2

Acrylic Acid Feed, Untreated

Inhibited acrylic acid or kerosene is used as solvent in formulating most of the antifoulants of this invention. Two untreated experiments are performed with each of the solvents for a baseline fouling rate.

For the untreated experiments, substantial polymer formation is observed on the trays and in the flask. Typically, polymer accumulation starts on the top of the trays, and then progresses to underneath the trays. Polymer precipitation is also seen on the boiler flask wall above and under the liquid line. In the untreated case, the liquid itself is clear and free from any suspended particles, indicating the liquid did not have any dispersing capability for polymer particles.

The experiments are terminated after 30 minutes of reflux operation. At the end of the experiments, the trays are completely covered with a thick white polymer layer. Twenty and twenty-one grams of polymer are recorded in the experiments with kerosene and acrylic acid control solvents, respectively.

EXAMPLE 3

Acrylic Acid Feed, Treated with Additives

The treated experiments are performed in the same manner as those untreated, except that a solution of (meth)acrylate and/or (meth)acrylamide-containing antifoulant polymers in kerosene or acrylic acid is continuously added above the tray section. All additives are compared at equivalent dosages on a weight to weight basis. The performance of an additive is measured by the reduction in polymer formation on the tray, and also the final appearance of flask. Reduction of polymer formation is defined as the percentage reduction in polymer formation in comparison with an untreated run. A scale of zero means no reduction in polymer formation compared to an untreated run, and 100 means a polymer-free tray section.

Three groups of additives are presented: representative (meth)acrylate and/or (meth)acrylamide-containing antifoulant polymers of this invention (Tests 6–19), representative dispersants (Test 1) and other polymers (Tests 2–5). The results are compiled in Table 1.

TABLE 1

| Test | Additives | Reduction, % | Flask appearance |
|---|---|---|---|
| 1 | Dodecylbenzene sulfonic acid | none | thick polymer precipitate layer at bottom; clear liquid, no dispersion |
| 2 | Polyisobutylene succinic acid polyethylene amine | none | large chucks of polymer; clear liquid, no dispersion |
| 3 | Alkylphenol-formaldehyde | 8 | Fine precipitates at the bottom of flask, clear liquid, no dispersion |
| 4 | Poly vinylpyrrolidone-graft-hexadecene | none | thick polymer layer and precipitates on flask wall, some dispersion |
| 5 | Poly vinylpyrrolidone-co-vinylacetate | none | thick polymer layer and precipitates on flask wall, some dispersion |
| 6 | Poly 2-ethylhexyl acrylate | 35 | no precipitates, clean flask wall, well-dispersed liquid phase |
| 7 | Polyethoxy methacrylate | 64 | Polymer on flask wall, some dispersion |
| 8 | Poly 2-ethylhexyl acrylate-co-styrene | 67 | no precipitates, clean flask wall, Well dispersed |
| 9 | Poly 2-ethylhexyl acrylate-co-vinyl acetate | 67 | no precipitates, clean flask wall, Well dispersed |
| 10 | Poly 2-ethylhexyl acrylate-co-diethylaminoethyl methacrylate | 68 | no precipitates, clean flask wall, dispersed |
| 11 | Poly lauryl methacrylate-co-acrylonitrile | 95 | no precipitates, clean flask wall, Well dispersed |
| 12 | Poly lauryl methacrylate-co-(N-tert-butyl acrylamide) | 26 | precipitates on the upper flask wall, no precipitates in liquid, well dispersed |
| 13 | Poly lauryl methacrylate-co-diethylaminoethyl methacrylate | 48 | no precipitates, clean flask wall, Well dispersed |
| 14 | Poly fluoroalkylethyl methacrylate-co-styrene | 94 | no precipitates, clean flask wall, Well dispersed |
| 15 | Poly (N-tert-butyl acrylamide)-co-styrene | 96 | no precipitates, clean flask wall, Well dispersed |
| 16 | Poly N-vinylpyrrolidone-co-dimethylaminoethyl methacrylate | 99 | no precipitates, clean flask wall, Well dispersed |
| 17 | Poly vinylpyrrolidone-co-vinylcaprolactam-co-dimethylaminoethyl methacrylate | 71 | trace precipitates on upper flask wall, most flask wall clean, well dispersed |
| 18 | Poly lauryl methacrylate-co-diethylaminoethyl methacrylate-co-(N-tert-butyl acrylamide | 73 | trace precipitates on upper flask wall, most flask wall clean, well dispersed |
| 19 | Poly butyl methacrylate-co-dimethylaminoethyl methacrylate-co-dodecyl methacrylate-co-octadecyl methacrylate | 99 | no precipitates, clean flask wall, Well dispersed |

As shown in Table 1, antifoulant additives with poly (meth)acrylate and (meth)acrylamide repeating units generally show good performance in reducing the amount of polymer formation on the trays, in dispersing polymeric foulant in the boiler flask of acrylic acid and in keeping the flask wall clean. In addition, copolymers of (meth)acrylate or (meth)acrylamide monomers with other vinyl monomers generally show good performance even when polymers of these other vinyl monomers themselves are ineffective. For example, poly vinylpyrrolidone-co-vinylacetate and poly vinylpyrrolidone-graft-hexadecene are not effective antifoulants for refluxing acrylic acid, but their copolymers with either (meth)acrylate or (meth)acrylamide are good. Although dodecylbenzene sulfonic acid, polyisobutenyl succinimides with polyethylene amines, and alkylphenol-formaldehyde based dispersants are claimed as effective additives for other processes, they did not perform as such for the acrylic acid process.

The test results also indicate that a copolymer antifoulant is generally more effective than a homopolymer antifoulant. As shown in the table, the performance of a copolymer antifoulant can be significantly improved through monomer selection and monomer unit mole ratio optimization.

EXAMPLE 4

Methacrylic Acid Feed, Untreated

In a similar fashion to Example 2, an untreated experiment is performed with methacrylic acid. The methacrylic acid is inhibited with 230 ppm MEHQ. An additional 500 ppm phenothiazine is added to the boiler flask.

During the experiment, polymer gradually forms and precipitates out on the boiler flask wall above the liquid, but the tray section remains clean. Fine polymer particles suspended in the liquid are noticed, but no precipitation occurrs during the experiment due to agitation by the magnetic stirrer. The reflux operation lasts for about 100 minutes. After the experiment, the liquid is collected in a bottle, and left undisturbed. With time, the suspended polymer particles precipitate out of the solution, settle to the bottom of the bottle, and leave a clear liquid phase above the bottom precipitates. This settling process takes about 4 hours in an ambient environment.

EXAMPLE 5

Methacrylic Acid Feed, Treated

This experiment is similar to the experiment in Example 3, except the additive from test #19, Table 1, is continuously injected into the reflux condensate during the experiment.

The experiment lasts about 100 minutes. The flask wall is free of any polymer precipitates at the end of the experiment. Fine polymer particles are also seen in the liquid, but there is no precipitation or settling of polymer particles out of the liquid even after many days. This observation demonstrates that this additive is an effective dispersant, keeping the polymeric particles from precipitating during and after the experiment.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. An antifoulant composition comprising (meth)acrylic acid and one or more (meth)acrylate or (meth)acrylamide antifoulant polymers, the antifoulant polymer prepared by polymerising
    a) about 5 to 100 mole percent of one or more (meth) acrylate or (meth)acrylamide monomers of formula

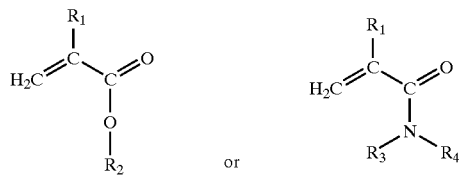

or a mixture thereof, wherein $R_1$ is independently selected at each occurrence from hydrogen and methyl; $R_2$ is selected from alkyl, aryl, cycloalkyl, alkylaryl, arylalkyl, aminoalkyl, aminoaryl, hydroxyalkyl, alkoxyalkyl, oxoalkyl and haloalkyl; and $R_3$ and $R_4$ are independently selected from hydrogen, alkyl, aryl, alkylaryl, arylalkyl, aminoalkyl, aminoaryl, hydroxyalkyl, alkoxyalkyl, oxoalkyl and haloalkyl, or $R_3$ and $R_4$, together with the nitrogen atom to which they are attached, form a heterocyclyl group; and
    b) 0 to about 95 mole percent of one or more vinylic monomers.

2. The antifoulant composition of claim 1 wherein the (meth)acrylate or (meth)acrylamide monomers are selected from methyl acrylate, ethyl acrylate, butyl acrylate, 2-ethylhexyl acrylate, methyl methacrylate, diethylaminoethyl methacrylate, ethyl methacrylate, isobutyl methacrylate, cyclohexyl methacrylate, lauryl methacrylate, dodecyl methacrylate, octadecyl methacrylate, benzyl methacrylate, ethoxy methacrylate, hydroxypropyl methacrylate, diethylaminoethyl methacrylate, 3-dimethylaminopropyl methacrylamide, N-butyl acrylamide, fluoroalkylethyl methacrylate, N-tert-butyl acrylamide, 2-hydroxypropyl methacrylamide, N-(butoxymethyl) methacrylamide, N-(2-methylpropoxy)methyl methacrylamide, methacrylic acid sodium salt and dimethylaminoethyl methacrylate sulfuric acid salt.

3. The antifoulant composition of claim 1 wherein the vinylic monomer(s) are selected from ethylene, propylene, butadiene, isoprene, styrene, vinyl acetate, vinyl chloride, vinyl pyrrolidone, vinyl caprolactam, tetrafluoroethylene, vinylidene chloride, vinyl sulfonic acid, acrylonitrile, methacrylonitrile, vinyl methyl ether, vinyl cyclohexane, acrolein, vinyl butyl sulfide, vinyl ethyl ketone, vinyl pyridine, allyl acetate, allyl alcohol, allyl amine, maleic acid, maleic anhydride.

4. The antifoulant composition of claim 1 wherein the antifoulant polymer is selected from poly 2-ethylhexyl acrylate, 2-ethylhexyl acrylate-co-styrene, poly 2-ethylhexyl acrylate-co-diethylaminoethyl methacrylate, poly 2-ethylhexyl acrylate-co-vinyl acetate, poly ethyl methacrylate, poly isobutyl methacrylate, poly cyclohexyl methacrylate, poly ethylhexyl methacrylate, poly lauryl methacrylate, poly dodecyl methacrylate, poly octadecyl methacrylate, poly benzyl methacrylate, polyethoxy methacrylate, poly hydroxypropyl methacrylate, poly dimethylaminoethyl methacrylate, poly diethylaminoethyl methacrylate, poly 3-dimethylaminopropyl methacrylamide, poly vinylpyrrolidone-co-dimetylaminoethyl methacrylate, poly lauryl methacrylate-co-ethylene glycol dimethacrylate, poly lauryl methacrylate-co-acrylonitrile, poly lauryl methacrylate-co-(N-butyl acrylamide), poly lauryl methacrylate-co-vinylpyridine, poly lauryl methacrylate-co-diethylaminoethyl metacrylate, poly fluoroalkylethyl methacrylate-co-styrene, poly dimethylaminoethyl methacrylate-co-vinylpyrrolidone-co-vinylcaprolactam, poly N-tert-butyl acrylamide-co-styrene, poly N-(2-hydroxypropyl) methacrylamide, poly N-(butoxymethyl) methacrylamide, poly N-[(2-methylpropxoy)methyl] methacrylamide, poly methacrylic acid sodium salt, poly dimethylaminoethyl methacrylate sulfuric acid salt, and poly butyl methacrylate-co-dimethylaminoethyl metacrylate-co-dodecyl methacrylate-co-octadecyl methacrylate.

5. The antifoulant composition of claim 1 wherein the antifoulant polymer is selected from poly 2-ethylhexyl acrylate, 2-ethylhexyl acrylate-co-styrene, poly 2-ethylhexyl acrylate-co-diethylaminoethyl methacrylate, poly 2-ethylhexyl acrylate-co-vinyl acetate, polyethoxy methacrylate, poly vinylpyrrolidone-co-dimetylaminoethyl methacrylate, poly lauryl methacrylate-co-ethylene glycol dimethacrylate, poly lauryl methacrylate-co-acrylonitrile, poly lauryl methacrylate-co-(N-butyl acrylamide), poly lauryl methacrylate-co-diethylaminoethyl metacrylate, poly fluoroalkylethyl methacrylate-co-styrene, poly dimethylaminoethyl methacrylate-co-vinylpyrrolidone-co-vinylcaprolactam, poly N-tert-butyl acrylamide-co-styrene, poly butyl methacrylate-co-dimethylaminoethyl metacrylate-co-dodecyl methacrylate-co-octadecyl methacrylate.

6. The antifoulant composition of claim 1 further comprising one or more polymerization inhibitors.

7. The antifoulant composition of claim 6 wherein the polymerization inhibitors are selected from hydroquinone, hydroquinone monomethyl ether, other phenol compounds, phenothiazine, 4-hydroxyl-2,2,6,6-tetramethylpiperidino-1-oxyl, other nitroxyl compounds, N-alkylphenylenediamines, nitrosated N-alkylphenylenediamines, hydroxylamines, nitrosophenylhydroxylamines, nitrosodiphenylamine, copper complexes, manganese complexes, and mixtures thereof.

8. The antifoulant composition of claim 1 further comprising one or more dispersants.

9. The antifoulant composition of claim 8 wherein the dispersants are selected from alkyl substituted aryl sulfonic acids and their salts, poly isobutylene succinic acid esters, poly isobutylene succinic acid imides of polyamines, alkylphenolethoxylates, alkylphenol-formaldehyde resins, fatty acid esters, fatty acid amides, fatty acid imidazolines, fatty alcohol ethoxylates and polysaccharide ethers and acetates.

10. The antifoulant composition of claim 1 further comprising one or more solvents.

11. A method of preventing fouling in a (meth)acrylic acid process comprising adding to the process stream an effective antifouling amount one or more (meth)acrylate or (meth) acrylamide antifoulant polymers, the antifoulant polymers prepared by polymerising
  a) about 5 to 100 mole percent of one or more (meth) acrylate or (meth)acrylamide monomers of formula

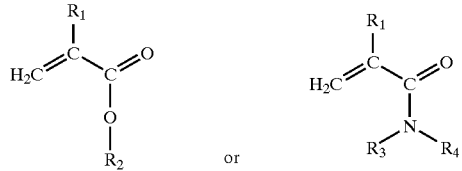

or a mixture thereof, wherein $R_1$ is independently selected at each occurrence from hydrogen and methyl; $R_2$ is selected from alkyl, aryl, cycloalkyl, alkylaryl, arylalkyl, aminoalkyl, aminoaryl, hydroxyalkyl, alkoxyalkyl, oxoalkyl and haloalkyl; and $R_3$ and $R_4$ are independently selected from hydrogen, alkyl, aryl, alkylaryl, arylalkyl, aminoalkyl, aminoaryl, hydroxyalkyl, alkoxyalkyl, oxoalkyl and haloalkyl, or $R_3$ and $R_4$, together with the nitrogen atom to which they are attached, form a heterocyclyl group; and
  b) 0 to about 95 mole percent of one or more vinylic monomers.

12. The method of claim 11 wherein the (meth)acrylate or (meth)acrylamide monomers are selected from methyl acrylate, ethyl acrylate, butyl acrylate, 2-ethylhexyl acrylate, methyl methacrylate, diethylaminoethyl methacrylate, ethyl methacrylate, isobutyl methacrylate, cyclohexyl methacrylate, lauryl methacrylate, dodecyl methacrylate, octadecyl methacrylate, benzyl methacrylate, ethoxy methacrylate, hydroxypropyl methacrylate, diethylaminoethyl methacrylate, 3-dimethylaminopropyl methacrylamide, N-butyl acrylamide, fluoroalkylethyl methacrylate, N-tert-butyl acrylamide, 2-hydroxypropyl methacrylamide, N-(butoxymethyl) methacrylamide, N-(2-methylpropoxy) methyl methacrylamide, methacrylic acid sodium salt and dimethylaminoethyl methacrylate sulfuric acid salt.

13. The method of claim 11 wherein the vinylic monomer (s) are selected from ethylene, propylene, butadiene, isoprene, styrene, vinyl acetate, vinyl chloride, vinyl pyrrolidone, vinyl caprolactam, tetrafluoroethylene, vinylidene chloride, vinyl sulfonic acid, acrylonitrile, methacrylonitrile, vinyl methyl ether, vinyl cyclohexane, acrolein, vinyl butyl sulfide, vinyl ethyl ketone, vinyl pyridine, allyl acetate, allyl alcohol, allyl amine, maleic acid, maleic anhydride.

14. The method of claim 11 wherein the antifoulant polymer is selected from poly 2-ethylhexyl acrylate, 2-ethylhexyl acrylate-co-styrene, poly 2-ethylhexyl acrylate-co-diethylaminoethyl methacrylate, poly 2-ethylhexyl acrylate-co-vinyl acetate, poly ethyl methacrylate, poly isobutyl methacrylate, poly cyclohexyl methacrylate, poly ethylhexyl methacrylate, poly lauryl methacrylate, poly dodecyl methacrylate, poly octadecyl methacrylate, poly benzyl methacrylate, polyethoxy methacrylate, poly hydroxypropyl methacrylate, poly dimethylaminoethyl methacrylate, poly diethylaminoethyl methacrylate, poly 3-dimethylaminopropyl methacrylamide, poly vinylpyrrolidone-co-dimetylaminoethyl methacrylate, poly lauryl methacrylate-co-ethylene glycol dimethacrylate, poly lauryl methacrylate-co-acrylonitrile, poly lauryl methacrylate-co-(N-butyl acrylamide), poly lauryl methacrylate-co-vinylpyridine, poly lauryl methacrylate-co-diethylaminoethyl metacrylate, poly fluoroalkylethyl methacrylate-co-styrene, poly dimethylaminoethyl methacrylate-co-vinylpyrrolidone-co-vinylcaprolactam, poly N-tert-butyl acrylamide-co-styrene, poly N-(2-hydroxypropyl) methacrylamide, poly N-(butoxymethyl) methacrylamide, poly N-[(2-methylpropxoy)methyl] methacrylamide, poly methacrylic acid sodium salt, poly dimethylaminoethyl methacrylate sulfuric acid salt, and poly butyl methacrylate-co-dimethylaminoethyl metacrylate-co-dodecyl methacrylate-co-octadecyl methacrylate.

15. The method of claim 11 wherein the antifoulant polymer is selected from poly 2-ethylhexyl acrylate, 2-ethylhexyl acrylate-co-styrene, poly 2-ethylhexyl acrylate-co-diethylaminoethyl methacrylate, poly 2-ethylhexyl acrylate-co-vinyl acetate, polyethoxy methacrylate, poly vinylpyrrolidone-co-dimetylaminoethyl methacrylate, poly lauryl methacrylate-co-ethylene glycol dimethacrylate, poly lauryl methacrylate-co-acrylonitrile, poly lauryl methacrylate-co-(N-butyl acrylamide), poly lauryl methacrylate-co-diethylaminoethyl metacrylate, poly fluoroalkylethyl methacrylate-co-styrene, poly dimethylaminoethyl methacrylate-co-vinylpyrrolidone-co-vinylcaprolactam, poly N-tert-butyl acrylamide-co-styrene, poly butyl methacrylate-co-dimethylaminoethyl metacrylate-co-dodecyl methacrylate-co-octadecyl methacrylate.

16. The method of claim 11 further comprising adding one or more polymerization inhibitors to the process stream.

17. The method of claim 16 wherein the polymerization inhibitors are selected from hydroquinone, hydroquinone monomethyl ether, other phenol compounds, phenothiazine, 4-hydroxyl-2,2,6,6-tetramethylpiperidino-1-oxyl, other nitroxyl compounds, N-alkylphenylenediamines, nitrosated N-alkylphenylenediamines, hydroxylamines, nitrosophenylhydroxylamines, nitrosodiphenylamine, copper complexes, manganese complexes, and mixtures thereof.

18. The method of claim 11 further comprising adding one or more dispersants to the process stream.

19. The method of claim 18 wherein the dispersants are selected from alkyl substituted aryl sulfonic acids and their salts, poly isobutylene succinic acid esters, poly isobutylene succinic acid imides of polyamines, alkylphenolethoxylates, alkylphenol-formaldehyde resins, fatty acid esters, fatty acid amides, fatty acid imidazolines, fatty alcohol ethoxylates and polysaccharide ethers and acetates.

20. The method of claim 11 wherein the antifoulant polymers are dissolved in one or more solvents.

21. The method of claim 11 wherein the (meth)acrylic acid process is selected from (meth)acrylic acid manufacturing processes, (meth)acrylic acid esterification processes, acrolein manufacturing processes and acrylonitrile manufacturing processes.

22. The method of claim 21 wherein the (meth)acrylic acid manufacturing processes is selected from (meth)acrylic acid recovery and purification.

23. The method of claim 11 wherein the (meth)acrylate or (meth)acrylamide antifoulant polymers are added continuously or intermittently to the (meth)acrylic acid process stream.

24. The method of claim 11 wherein about 1 to about 10,000 ppm of the (meth)acrylate or (meth)acrylamide antifoulant polymers are added to the process stream.

25. The method of claim 11 wherein about 10 to about 1,000 ppm of the (meth)acrylate or (meth)acrylamide antifoulant polymers are added to the process stream.

26. The method of claim 11 wherein about 20 to about 200 ppm of the (meth)acrylate or (meth)acrylamide antifoulant polymers are added to the process stream.

* * * * *